United States Patent [19]
Pearson et al.

[11] 3,865,600
[45] Feb. 11, 1975

[54] SOIL CONSOLIDATION

[75] Inventors: Leonard Louis Pearson, Slough; Anthony Cecil Plaisted, Chalfont St. Peter, both of England

[73] Assignee: Fosroc AG, Zug, Switzerland

[22] Filed: Feb. 26, 1973

[21] Appl. No.: 335,971

[30] Foreign Application Priority Data
Mar. 8, 1972 Great Britain .................... 10846/72
Mar. 17, 1972 Great Britain .................... 12682/72

[52] U.S. Cl. ............................... 106/84, 106/287.55
[51] Int. Cl. ............................................... C04b 19/04
[58] Field of Search ........ 106/74, 84, 38.35, 287.55

[56] References Cited
UNITED STATES PATENTS
3,493,406   2/1970   Fillet et al............................ 106/74
3,558,506   1/1971   Bonnel et al......................... 106/74
3,642,503   2/1972   Beaney ................................ 106/74

*Primary Examiner*—J. Poer
*Attorney, Agent, or Firm*—Caesar, Rivise, Bernstein & Cohen

[57]  ABSTRACT

Loose or porous soil is consolidated by gelling therein an aqueous solution of an alkali metal silicate, preferably sodium silicate. According to the invention, the gelling agent is a water-miscible blend of acetic acid esters of glycerol most preferably one having a defined saponification value value falling within the range of 503 to 580 mg KOH/g.

20 Claims, No Drawings

SOIL CONSOLIDATION

The invention relates to the consolidation of soil, particularly to the creation of water-impermeable underground barriers.

It has been proposed to consolidate sandy, loose or porous soil by applying to the soil an aqueous solution of an alkali metal silicate together with a gelling agent, the latter acting to gel the silicate into an insoluble silica gel. Several chemicals have been proposed as the gelling agent but they all suffer from one or more drawbacks; for example, they are hazardous or toxic, they are expensive and the gel formed lacks adequate strength. The invention is based on the discovery that the use of a tripartite blend of acetyl esters of glycerol as a gelling agent has certain advantages.

According to the invention, a method of consolidating soil comprises applying to the soil an aqueous solution of an alkali metal silicate and a watermiscible gelling agent therefor, the gelling agent being a blend of acetic acid esters of glycerol, the relative proportions of the esters in the blend being selected such that the blend gels substantially all the silicate to form in the soil, in time, a water-impervious gel.

The esters of glycerol are prepared commercially by reacting glycerol with an acetylating agent conveniently ketene, acetic anhydride or acetic acid, and depending on the reaction conditions, e.g. temperature and time, a ternary system of the mono-ester, (so-called "monoacetin") diester (so-called "diacetin") and triester (so-called "triacetin") is formed. Commercially available "diacetin" will contain a proportion of the monoester and the proportion will vary according to the source of supply from as low as 20 percent to as high as 75 percent. Nevertheless, such blends are identified commercially by the name "diacetin" and the ester value is expressed as a saponification value in terms of only one constituent present e.g. diacetin British Standard BS 1594:1950. The gelling agent of the invention must contain all three esters since otherwise the gelling agent is not sufficiently water-miscible and gelling rate is not satisfactory.

For improved accuracy the gelling agent is defined herein by a saponification value determined by the method of BS 1594:1950 mentioned above; the blend of the invention preferably has a saponification value of 503 to 580 mg KOH/g, above all 503 to 535 mg KOH/g. In practice such a blend will tend to contain more of the diester than the triester and sufficient of the monoester to impart water miscibility to the blend.

A preferred alkali metal silicate is sodium silicate, most preferably having a $SiO_2:Na_2O$ ratio of 2.5 to 3.2:1.

The gelling agent blend is preferably used in a weight ratio of 1:10 to 1:20 relative to the silicate solution, the rate being adjusted to give a convenient gelling time which may range from a few minutes to up to say 4 hours. This is simple to do on site, as both silicate and the gelling agent blend are miscible in water.

The aqueous solution applied to the soil should be diluted with water to a degree such that the solution is of sufficient low viscosity to permeate the structure of the soil to be consolidated to form a gel of adequate strength.

It is of course possible to use other gelling agents in association with the gelling blend, examples being acetyl esters of glycol, for instance ethylene glycol diacetate.

The application of the aqueous solution to the soil may be carried out using customary techniques; preferred techniques are those which involve insertion of apertured rods to inject the consolidant into the soil at a predetermined depth.

In a preferred application technique, alkali metal silicate solution, water and an aqueous solution of the gelling agent are drawn from separate sources into a proportioning pump, mixed and then pumped into the soil. Because the reactants are miscible with water, proportions may readily be altered on site. This is an advantage because the soil structure tends to vary from place to place and so silicate solutions of different concentrations and viscosities and different speeds of gelling may be required.

By the use of the method according to the invention, soils such as loose porous soils can be consolidated to an extent such that the crushing strength of a core, when tested in the manner set out in BS 1881 Part 4, typically is 1.5 Newtons/mm$^2$ or greater. The permeability to water of consolidated soil tends to be reduced to $10^{-8}$ cm/sec or less.

The invention includes for use in a method of consolidating soil by gelling an aqueous solution of alkali metal silicate, a water-miscible gelling agent for the silicate, the gelling agent being a blend of acetic acid esters of glycerol, preferably having a saponification value as determined by BS 1594:1950 of 503 to 580 mg KOH/g, most preferably of from 503 to 535 mg KOH/g. The invention also includes soil consolidated by the method.

The invention is illustrated by the following Examples in each of which a gelling agent was used to gel a sodium silicate in an aggregate to form a consolidated structure. In each case, the aqueous sodium silicate solution had a specific gravity of 1.375 and a mean weight ratio of $SiO_2Na_2O$ of 3.2:1. The viscosity of the solution was 100 centipoise when tested at 20°C. The gelling agent comprised a blend of mono-, di- and tri -acetin in a weight ratio of 56:28:16 and having a saponification value of 535 mgKOH/g. The aggregate was selected according to British Standard BS 882 "Specification of natural aggregates for concrete" and where sieve sizes are specified these complied with British Standard BS 410. The terms zone 2 concrete sand, rendering sand, 20-5mm gravel and 20 mm all in gravel are terms specified in British Standards and well used in the art.

In the method of the Examples, the oven-dried aggregates were blended together in a mixer. The gelling agent was mixed with an equal volume of water and the remainder of the allocated water was mixed with sodium silicate solution. The two diluted solutions were vigorously mixed together and then added to the aggregates following which the mixer was kept running for 2 minutes. Cubes each 100 mm$^3$ were cast from the consolidated aggregates and air stored at 20°C ± 2°C until tested for compressive strength by the method of British Standard BS 1881.

The proportions used and the results obtained are shown in the Table from which it can be seen that the aggregates were consolidated to high compressive strengths.

| Example | Zone 2 Concrete Sand | -200 Slate powder | rendering sand | 20-5mm gravel | 20 mm all in gravel | Sodium silicate | gelling blend | water | Reactant ratio to aggregate % by weight | Compressive Strengths (N/mm²) 1 day | 7 day |
|---|---|---|---|---|---|---|---|---|---|---|---|
| 1 | 100 | | | | | 10 | 1.2 | 6.7 | 30 | 0.21 | * |
| 2 | 80 | 20 | | | | 10 | 1.2 | 4.5 | 30 | 0.91 | * |
| 3 | 80 | 20 | | | | 10 | 1.2 | 6.7 | 30 | 0.60 | * |
| 4 | 80 | 20 | | | | 10 | 1.2 | 6.7 | 30 | 0.77 | 2.17 |
| 5 | 80 | 20 | | | | 10 | 1.2 | 13.5 | 30 | 0.01 | 1.04 |
| 6 | 80 | 20 | | | | 10 | 1.2 | 20 | 30 | 0 | 0.07 |
| 7 | 80 | 20 | | | | 10 | 1 | 5 | 30 | 0.98 | 3.71 |
| 8 | 80 | 20 | | | | 10 | 1 | 10 | 30 | 0.28 | 2.17 |
| 9 | | | 100 | | | 10 | 1 | 5 | 30 | .38 | 1.26 |
| 10 | | | 100 | | | 10 | 1 | 10 | 30 | .01 | * |
| 11 | | | | 40 | 60 | 10 | 1 | 5 | 20 | .98 | 1.89 |
| 12 | | 8 | | | 92 | 10 | 1 | 10 | 20 | .01 | 0.98 |

* not recorded

We claim:

1. A method of consolidating soil to create waterimpermeable underground barriers, said method comprising applying to the soil an aqueous solution consisting essentially of an alkali metal silicate and a water-miscible gelling agent therefor, the gelling agent having a saponification value of 503 to 580 mg. KOH/g and being a tripartite blend of the mono-, di and triacetate acid esters of glycerol, the monoacid ester being in a substantial amount to impart water miscibility to the other two esters, the di-acid ester and the tri-acid ester being present to hydrolyze the silicate, so that the tripartite blend gels substantially all the silicate to form in the soil within a reasonably short period of time, a water-impervious gel.

2. A method according to claim 1, in which the gelling agent has a saponification value of 503 to 535 mg KOH/g.

3. A method according to claim 1, in which the alkali metal silicate solution comprises a solution of a sodium silicate having an $SiO_2:Na_2O$ ratio of 2.5 to 3.2:1.

4. A method according to claim 1 in which the gelling agent is used in a weight ration of 1:10 to 1:20 relative to the alkali metal silicate solution.

5. A method according to claim 1 in which there is an auxillary gelling agent.

6. A method according to claim 1 in which the auxillary gelling agent is an acetyl ester of glycol.

7. A method according to claim 1 in which the auxillary gelling agent is ethylene glycol diacetate.

8. A method according to claim 1 in which an aqueous solution of the alkali metal silicate and an aqueous solution of the gelling agent is diluted with water to give a solution of low viscosity to permeate the structure of the soil.

9. A method according to claim 1, in which the aqueous solution of an alkali metal silicate, water and an aqueous solution of the gelling agent are drawn from separate sources into a proportioning pump, mixed and then pumped into the soil to be consolidated.

10. A method according to claim 1 in which the combined weight of the silicate and the gelling agent constitutes at least 20 percent by weight of the soil.

11. Soil consolidated into water-impermeable underground barriers through the addition to the soil of an aqueous solution consisting essentially of an alkali metal silicate and a water-miscible gelling agent therefor, the gelling agent having a saponification value of 503 to 580 mg. KOH/g and being a tripartite blend of the mono-, di, and tri-acetate acid esters of glycerol, the mono-acid ester being present in a substantial amount to impart water miscibility to the other two esters, the di-acid ester and the tri-acid ester being present to hydrolyze the silicate, so that the tripartite blend gels substantially all the silicate to form in the soil within a reasonably short time period, a waterimpervious gel.

12. The consolidated soil of claim 11 in which the gelling agent has a saponification value of 503 to 535 mg KOH/g.

13. The consolidated soil of claim 12 in which the alkali metal silicate solution comprises a solution of a sodium silicate having an $Si_2O:Na_2O$ ratio of 2.5 to 3.2:1.

14. The consolidated soil of claim 13 in which the gelling agent is used in a weight ratio of 1:10 to 1:20 relative to the alkaki metal silicate solution.

15. The consolidated soil of claim 14, in which there is an auxillary gelling agent.

16. The consolidated soil of claim 15 in which the auxillary gelling agent is an acetyl ester of glycol.

17. The consolidated soil of claim 16 in which the auxillary gelling agent is ethylene glycol diacetate.

18. The consolidated soil of claim 17 in which an aqueous solution of the alkali metal silicate and an aqueous solution of the gelling agent is diluted with water to give a solution of low viscosity to permeate the structure of the soil.

19. The consolidated soil of claim 18 in which the aqueous solution of an alkali metal silicate, water and an aqueous solution of the gelling agent are drawn from separate sources into a proportioning pump, mixed and then pumped into the soil to be consolidated.

20. The consolidated soil of claim 19 in which the combined weight of the silicate and the gelling agent constitutes at least 20 percent by weight of the soil.

* * * * *